United States Patent
Zhou et al.

(10) Patent No.: US 12,028,622 B2
(45) Date of Patent: Jul. 2, 2024

(54) IMAGING SENSOR WITH BRIGHTNESS SELF-ADJUSTMENT

(71) Applicant: Lumcolor, Chino, CA (US)

(72) Inventors: Rich S. Zhou, Chino, CA (US); Yingchun Han, Chino, CA (US); Kenny Chu, Chino, CA (US)

(73) Assignee: Lumcolor, Chino, CA (US)

( * ) Notice: Subject to any disclaimer, the term of this patent is extended or adjusted under 35 U.S.C. 154(b) by 155 days.

(21) Appl. No.: 17/816,725

(22) Filed: Aug. 1, 2022

(65) Prior Publication Data

US 2023/0030160 A1 Feb. 2, 2023

Related U.S. Application Data

(63) Continuation-in-part of application No. 16/550,296, filed on Aug. 26, 2019, now abandoned.

(51) Int. Cl.
*H04N 5/335* (2011.01)
*G02B 27/28* (2006.01)
*H04N 23/75* (2023.01)

(52) U.S. Cl.
CPC .......... *H04N 23/75* (2023.01); *G02B 27/283* (2013.01)

(58) Field of Classification Search
CPC ..................................................... H04N 23/75
See application file for complete search history.

(56) References Cited

U.S. PATENT DOCUMENTS 11,199,735 B2 * 12/2021 Zhou .................... G02F 1/13306
2020/0310178 A1 * 10/2020 Zhou ....................... G02F 1/137

* cited by examiner

*Primary Examiner* — Gary C Vieaux
(74) *Attorney, Agent, or Firm* — Kilpatrick Townsend & Stockton LLP

(57) ABSTRACT

An image sensor having a brightness self-adjust capability is provided. The image sensor can include a light adjustment layer made of adaptive optical materials and a set of pixels. The image sensor can also include a control circuit configured to generate control signals to control adjustment of one or more light transparency levels at the set of pixels on the light adjustment layer based on the light intensity distribution. The image sensor can further include a sensor array configured to receive lights and facilitate output of image and/or video signals based on the received lights. For facilitating light adjustment, the control circuit can be configured to obtain light intensity distribution from a pre-sensor or the sensor array.

15 Claims, 7 Drawing Sheets

RSOF– Reflective Smart Optical Filter
PBS– Polarizing Beam Splitter

IMAGING SENSOR WITH BRIGHTNESS SELF-ADJUSTMENT

CROSS-REFERENCE TO RELATED APPLICATIONS

This application is a Continuation-in-Part application of, and claims priority benefit to U.S. application Ser. No. 16/550,296, filed on Aug. 26, 2019, and entitled "IMAGING SENSOR WITH BRIGHTNESS SELF-ADJUSTMENT".

FIELD OF THE INVENTION

The invention relates a novel imaging sensor. In general, it relates to enhancing optical imaging quality, and in particular to light intensity self-adjustment through smart optical filters.

BACKGROUND OF THE INVENTION

An image sensor or imager is a sensor that detects and conveys information used to make an image. It does so by converting the variable attenuation of light waves (as they pass through or reflect off objects) into signals, small bursts of current that convey the information. The waves can be light or other electromagnetic radiation. Image sensors are used in electronic imaging devices of both analog and digital types, which include digital cameras, camera modules, medical imaging equipment, night vision equipment such as thermal imaging devices, radar, sonar, and others. As technology changes, digital imaging tends to replace analog imaging. In the situation of objects reflecting and/or transmitting lights with very large variations, conventional imaging sensors suffers often technical difficulty in dynamic range of response in brightness. For instance, lights from "very bright objects" will saturate the sensor whereas lights from "very dark objects" will under expose the sensor. This problem, in either case, will leads to the loss of information.

SUMMARY OF THE INVENTION

An imaging sensor having a brightness self-adjust capability (ISWBSA) is provided. Such an imaging sensor can include light adjustment layers made of adaptive optical materials and a set of pixels. The image sensor can also include a polarizing beam splitter that splits the incoming lights into two orthogonal polarized components and combines two components together in a later stage. Two different polarizing components can be controlled and adjusted in brightness at pixel level, independently. The imaging sensor can also include a control circuit configured to generate control signals to control adjustment of one or more light transparency levels at the set of pixels on the light adjustment layers based on the light intensity distribution. The control signals can include a first control signal to control adjustment of a first light transparency level at a first pixel of the light adjustment layers. The imaging sensor can further include a sensory array configured to receive lights and facilitate output of image and/or video signals based on the received lights.

For facilitating light adjustment, the control circuit can be further configured to obtain light intensity distribution information regarding light intensity distribution in a field of view (FOV) of the image sensor; and control the light adjustment layer to adjust, for the sensor array, the lights through the set of pixels according to the light intensity distribution information. In some embodiments, the control circuit can obtain the light intensity distribution from the sensor array. In some embodiments, the control circuit can obtain the light intensity distribution from a pre-sensor included in the image sensor.

In some embodiments, the light adjustment layer can be arranged at one of two positions including a first position and a second position. In those embodiments, at the first position, the light adjustment layer may not be operable to adjust the lights, and at the second position, the light adjustment layer may be operable to adjust the lights.

DETAILED DESCRIPTION

Human eyes are known to be able to adaptively adjust the "effective sensitivity" of retinal via visual neurons. Therefore, humans can perceive objects under various light conditions. However, current photo image sensors are much limited compared with human eyes in dynamic range of reposing to incident light intensity levels. For example, it has been a challenge for optical image sensors to produce quality images when there are brightness variations in different zones in the field of view (FOV) of an optical image sensor. This drawback can result in an image being saturated in bright zones or having no response at all in dark zones when there such brightness variations in FOV. Either would lead to information loss in the image.

Figure 1A:
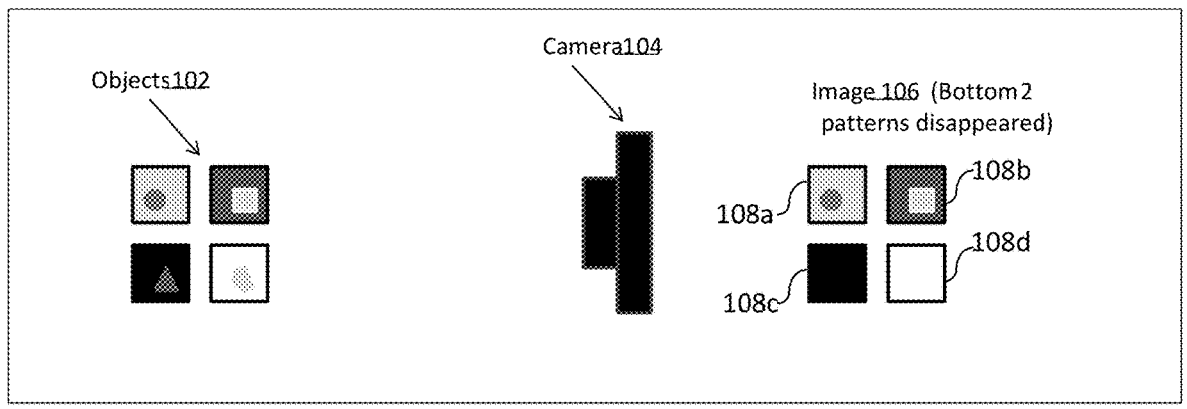
FIG. 1A illustrates how traditional imaging under brightness variations may impact image quality.

FIG. 1A illustrates how traditional imaging under brightness variations may impact image quality. This is conceptualized in FIG. 1A by showing 4 zones in an image 106 of objects 102 captured by a traditional camera 104. The different shadings of the zones 108a-d in FIG. 1A represent different brightness level for the objects under the light condition when the objects are captured on the image. As shown, the bottom right zone 108d is the brightest of all, and the bottom left zone 108c is the darkest of all. Due to the dynamic range of response on light sensitivity of the image sensor on the camera is limited as described above, the details in top zones 108a-b would be captured well but that in bottom zones 108c-d may be lost in a sense that details of the objects 102 at bottom zones 108c-d are not shown in the image, thus leading to aforementioned information loss in the image. Post-process in conjunction with so called "bucket exposures" is the most commonly used way to retrieve the complete information by combining every frame in the "bucket" in which a set of frames were captured with slightly different exposures. It, however, takes extra time and cost to obtain the final image. In addition, the blended image often lost some aspects of artistic looking.

One motivation behind the present disclosure is to facilitate adjusting variations in brightness in a FOV of image sensor of an imaging device such that intensities of incident lights from the FOV are adjusted when the image sensor receives them. That is, if intensities of lights in brighter zones in the FOV can be somehow toned down relative to the rest of light intensities in the FOV such that the overall brightness variation in the entire FOV would be contained inside of the linear response range of the sensor, the aforementioned imaging problem can be somewhat addressed.

However, a challenge for achieving this is form factor and cost. Naturally, a good solution should lie in simple of use and being viable even for the ever increasing digital imaging for casual users. Another challenge is that brightness variations in the FOV are typically random. That is, locations of brighter zones in the FOV are not known until the lights hit the image sensor. While there are some existing solutions employing filtering of lights before they hit the image sensor, these solutions presume certain patterns of lights and thus may only work in a limited number of situations where brightness variations in the FOV are consistent with those patterns.

Optical Smart Filter in General

In accordance with the disclosure, embodiments provide an image sensor with brightness self-adjustment capability (ISWBSA) capable of facilitating dynamically adjustment of brightness variations in the lights from optical field before outputting signals for imaging. For achieving this, an ISWBSA in accordance with the disclosure can include a smart optical filter (SOF) which, in some embodiments, can be either constructed together with the sensor chip with a close-loop feedback control micro-electronics or simply placed in front of the imaging shutter with a Left-Drop structure for ON/OFF purpose.

Figure 1B:
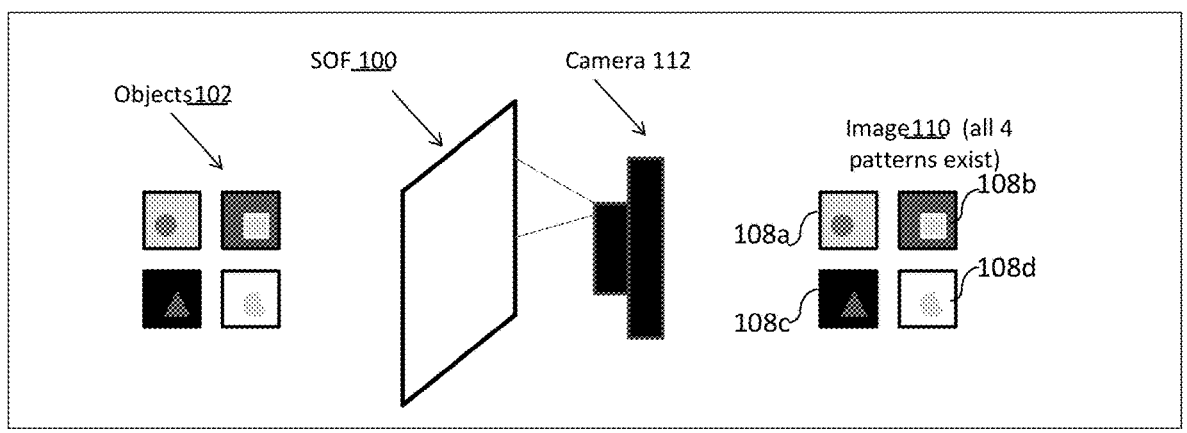
FIG. 1B illustrates generally a scenario where a smart optical filter (SOF) in accordance with the disclosure is used to improve image quality.

FIG. 1B illustrates generally illustrates how a SOF can be employed in an ISWBSA in accordance with the disclosure to improve image quality. As shown, objects 102 in a FOV may be illuminated by incident lights with different brightness levels at different spots on the objects 102, which is similar to that in FIG. 1A as described above. As shown, the SOF 100 can be included in a camera 112 having a ISWBSA in accordance with the disclosure. The SOF 100 can be configured to adjust light transparency at different zones on the SOF 100 such that light transparency at a zone on the SOF 100 corresponding to the bottom right zone 108d can be adjusted to block most of the lights at that spot from going through the ISWBSA of the camera 112; and light transparency at a zone on the SOF 100 corresponding to the bottom left zone 108c can be adjusted to let most of the lights at that zone through the ISWBSA of the camera 12. As shown, this can result in the bottom two zones 108c-d of the image showing the details of the objects, which is an improvement over the image shown in FIG. 1A.

It should be understood the example shown in FIG. 1 is just mere illustration of concept of an ISWBSA in accordance with the disclosure, hence is not intended to be limiting. The light transparency adjustment by the SOF 100 included in an ISWBSA in accordance with the disclosure is dynamic such that any zone on the smart optical filter may be adjusted depending on the light condition. For instance, in some other situations where the top right zone 110b is the brightest, the SOF layer 100 included in the ISWBSA can adjust the light transparency at the area on the SOF layer included in the ISWBSA corresponding to those zones to block most of the lights. That is, the light transparency adjustment by the SOF 100 is dynamic depending on the brightness variation in the FOV.

A key to such dynamic light transparency level adjustment lies in an adaptive optical material employed by the SOF 100. Several adaptive optical materials such as opto-electrical crystals, dynamic optical polymers, and liquid crystals have optical properties such as transmittance, polarization, as well as phases that can be employed to adjust transmittance level of lights passing though these materials. For example liquid crystal has advantages in manufacturability, lower driving voltages, and effective cost, has been widely applied in real-time display industry.

Figure 2A:
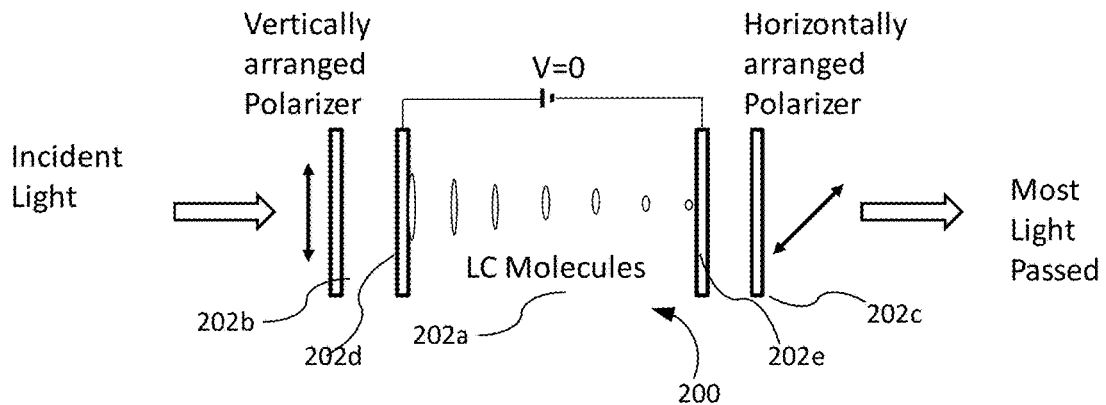
FIG. 2A illustrates a configuration of the liquid crystal modules in an SOF in accordance with the disclosure where most of the lights can be let pass though at a first pixel on the smart optical filter.
Figure 2B:
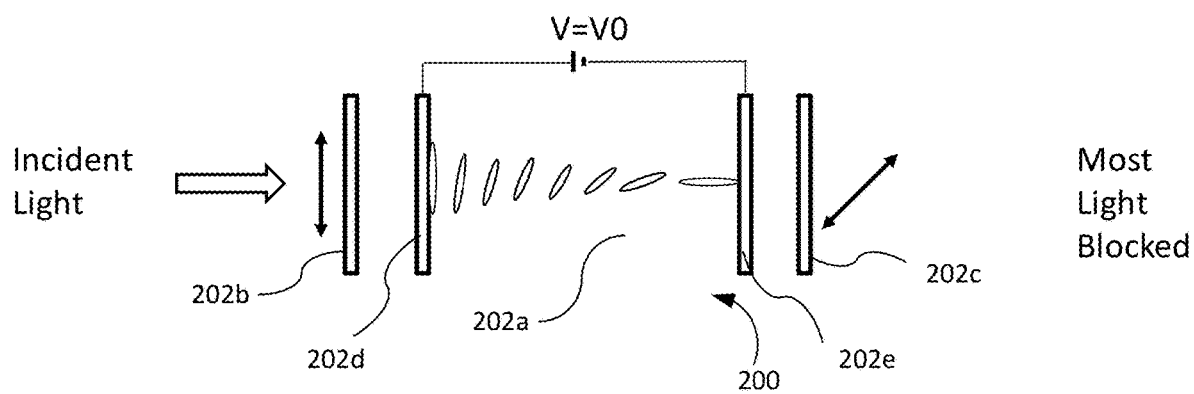
FIG. 2B illustrates an configuration of the liquid crystal modules in an SOF in accordance with the disclosure where most of the lights can be blocked at a second pixel on the smart optical filter.
Figure 2C:
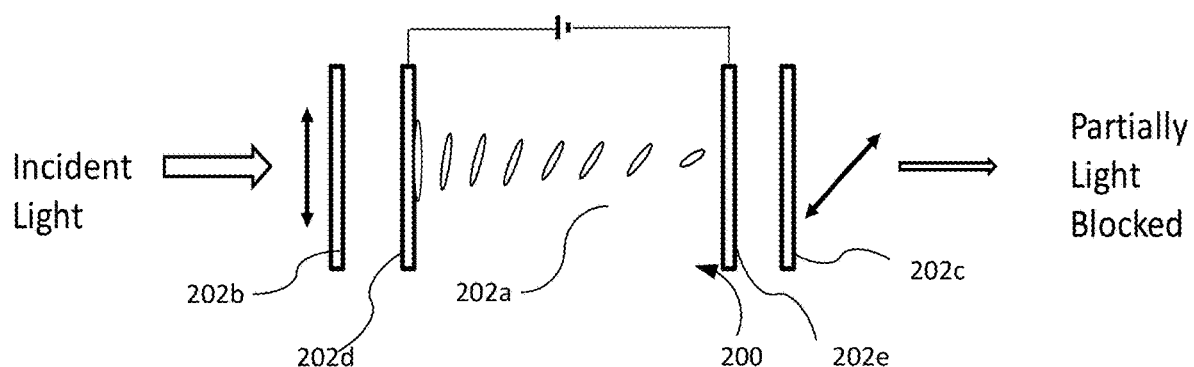
FIG. 2c illustrates a configuration of the liquid crystal modules in an SOF in accordance with the disclosure where some of the lights can be blocked and some of the lights can be let pass through at a third pixel on the SOF.

FIGS. 2a-c illustrates an example SOF 200 in accordance with the disclosure from the perspective of an optical material employed. In this example, as can be seen liquid crystal is used in the SOF 200. As shown, the SOF 200 comprises a layer 202a having liquid crystal modules. FIG. 2a illustrates a configuration of the liquid crystal modules in the SOF 200 where most of the lights can be let pass though at a first pixel on the SOF 200. FIG. 2b illustrates a configuration of the liquid crystal modules in the SOF 200 where most of the lights can be blocked at a second pixel on the SOF 200. FIG. 2c illustrates an configuration of the liquid crystal modules in the SOF 200 where some of the lights can be blocked and some of the lights can be let pass through at a third pixel on the SOF 200.

As shown, liquid crystal molecules in layer 202a can be structured between two transparent electrodes 202d and 202e, and the two polarizers 202b and 202c can be arranged such that the polarization axes are perpendicular to each other. The initial orientation of the liquid-crystal molecules at two sides can be manipulated by mechanically rubbing polymer coated surfaces. In a twisted nematic (TN) device, the surface alignment directions at the two sides are arranged in perpendicular to each other, and so that the liquid crystal molecules can arrange themselves in a helical structure, or twist. As explained above, the orientation of the liquid crystal can be used to induce the rotation of the polarization of the incident light, thus the layer 202a in conjunction with the polarizers act as an adjustable light transparency filter. That is, when the applied voltage is large enough, the liquid crystal molecules in the center of the layer can almost be completely untwisted and the polarization of the incident light is not rotated as it passing through the liquid crystal layer—see for example FIG. 2B. This light will then be mainly polarized perpendicular to the second polarizer, and thus be blocked and the pixel will appear darker. By controlling the voltage applied across the liquid crystal layer in each pixel, light can be allowed to pass through in varying amounts—see for example FIG. 2C. As shown, in the three configurations in FIGS. 2A-C, different voltages are applied to impact the orientations of the liquid crystal modules in the layer 202 to achieve different light transparency levels.

Example Implementations of ISWBSA

With general principles of the smart optical filter in accordance with the disclosure having been described and illustrated, attention is now directed to FIGS. 3A-B, where example implementations of a ISWBSA in accordance with the disclosure is illustrated.

Figure 3:
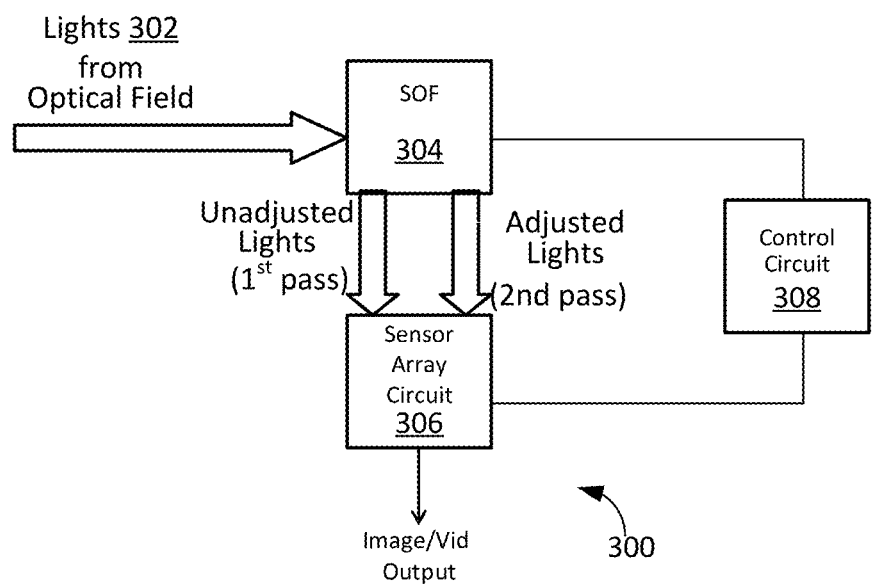
FIG. 3 illustrates an example implementation of an imaging sensor with brightness self-adjustment (ISWBSA) in accordance with the disclosure.

FIG. 3 illustrates an example implementation a pass-through ISWBSA 300. As shown, a pass-through ISWBSA in accordance with the disclosure, such as the ISWBSA 300, can include a SOF 304, a sensory array circuit 306, a control circuit 308, and/or any other components. The SOF 304 may comprise, polarizers, electrodes, optical materials divided in to pixels and/or any other elements. An example of SOF 304 is shown in FIGS. 2A-C. As shown in FIGS. 2A-C, for example, each pixel of SOF 304 may comprise, two polarizers, two electrodes (i.e. an individual positive one and a common ground) and optical materials such as liquid crystal modules. As also shown in FIG. 2A-C, an orientation of, for example, the liquid crystal modules can be adjusted by applying different amount voltage to the electrodes through the driving signals generated by the control circuit 308. In this way, the SOF 304 can be manipulated dynamically and granularly in real-time to impact brightness distribution of the optical field after passing through the SOF 304.

The sensor array circuit 306 can include one or more senor arrays for receiving lights from FOV and for facilitating imaging with the received lights. As shown, with the ISWBSA 300, lights 302 can be first received by and pass through the SOF 304 (a first pass), and hits the sensor array(s) on sensor array circuit 306. As shown the control circuit 308 can be configured to detect whether the lights when hitting the sensor array(s) on sensor array circuit 306 have already been adjusted by SOF 304 (i.e., whether it is the first pass). In the first pass, pixels on the SOF 304 may be in a state as shown in FIG. 2A such that the lights 302 passes through SOF 304 unadjusted.

In this implementation, if the control circuit 308 determines the lights have not already been adjusted SOF 304 (i.e., it is the first pass), control circuit 308 may be configured to control the SOF 304 to adjust the lights according to the general principles described and illustrated in FIG. 1B and FIGS. 2A-C. In implementations, the control circuit 308 may be configured to store a value indicating whether lights 302 having been adjusted by SOF 304 already. For example, a value of 0 may indicate the lights 302 has not been adjusted, and a value of 1 may indicate the lights 302 have been adjusted. When the lights 302 passes through SOF 304 in the first pass, the control circuit 308 may detect this is the first pass by reading the value of 0.

In implementations, after detecting it is the first pass, the control circuit 308 can be configured to control adjustment of the light transparency level at various pixels on the SOF 304 based on the light intensity distribution detected by sensor array circuit 306. By way of illustration, the control circuit 308 may be configured with various thresholds corresponding to different light transparency levels for such adjustment. For example, transparency level adjustment may be instigated through a pixel on the SOF 304 based on the intensity value of the light corresponding to pixel. In one embodiment, it is contemplated that the detected light intensity value at a given spot in the FOV is compared to one or more thresholds and determining a difference value with respect to the one or more thresholds. In that embodiment, the control circuit 308 may be configured to generate a control signal to adjust (e.g. smooth) the difference value. The control signal may include information indicating a location of the pixel on the light adjustment layer 308 and one or more instructions for adjusting the difference value.

After adjusting the SOF 304, the control circuit 308 can then change the value to 1. When the lights 302 hit the sensor array(s) on the sensor array circuit 308 again, the control circuit 308 can then determine the lights have already been adjusted by SOF 304 by reading the value 1. The control circuit 308 may then be configured to facilitate the sensor array circuit 306 to output the image and/or video signals from the sensor array circuit 306.

Figure 4:
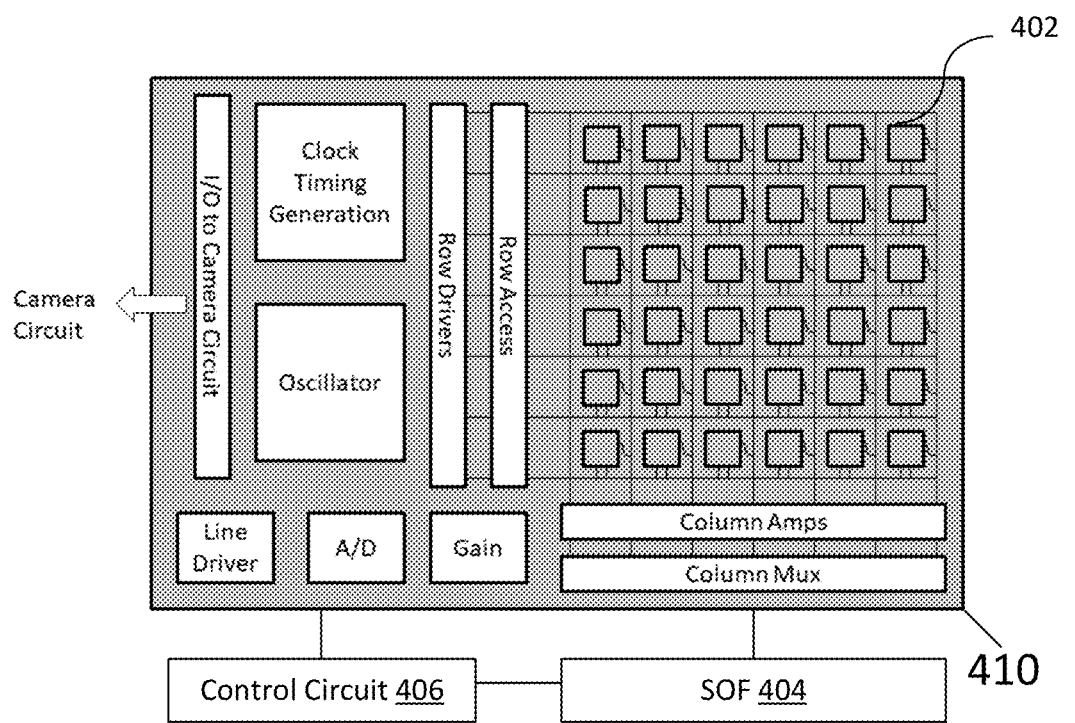
FIG. 4 illustrates a schematic view of an example implementation of the ISWBSA shown in FIG. 3.

FIG. 4 illustrates a schematic view of an ISWBSA 400 in accordance with the disclosure. As shown, the ISWBSA 400 includes a sensor array circuit 410 having a sensor array 402 with individual pixels. As shown, the sensor array circuit 410 can include row/column drivers configured to generate detection/driving signals for a given pixel on the sensor array 402. For example, row/column drivers may be configured to drive a particular pixel in accordance with one or more control signals generated by the control circuit 406. By way of illustration, the driving signals generated by the column/row drivers may involve an amount of voltage to be applied to electrodes at the given pixel, a duration for applying voltage, and/or any other controls. In implementations, as shown, the sensor array circuit 410 may be connected with control circuit 406. As also shown, a SOF 404 can be included in or on top of the sensor array circuit 410. In this way, together with the control circuit 406, the SOF 404, the sensor array circuit 410 and/or any other components, example implementations of ISWBSA shown in FIG. 3A or 3B can be achieved.

Figure 5:
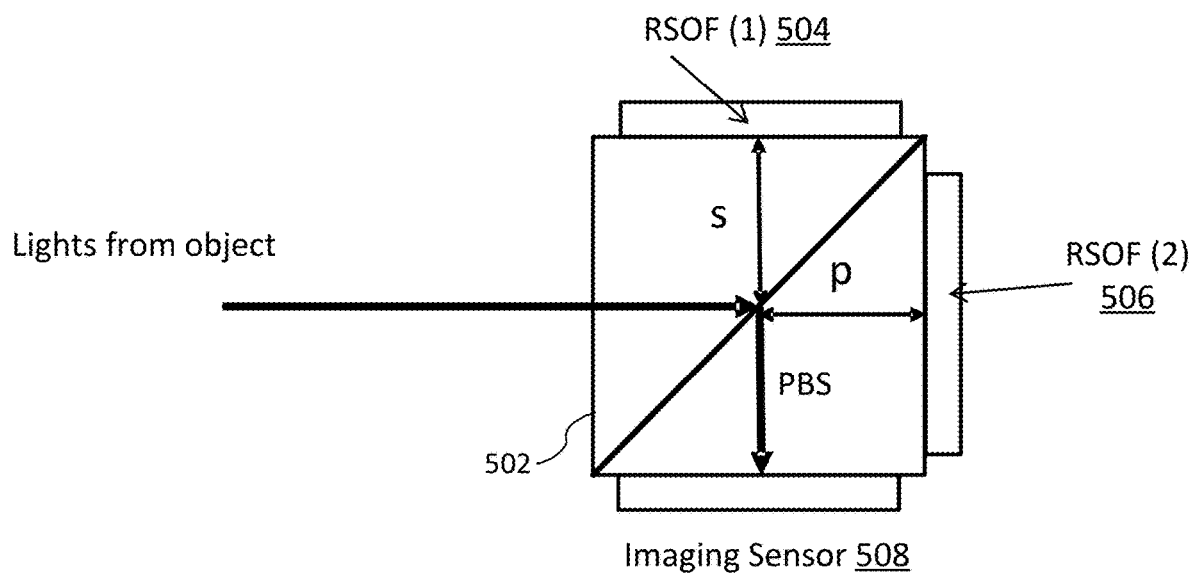
FIG. 5 illustrates an example of an imaging sensor with dynamic brightness self-adjustment in accordance with the disclosure.

FIG. 5 illustrates an example of an imaging sensor 500 with dynamic brightness self-adjustment in accordance with the disclosure. In this example, the imaging sensor 500 includes a polarizing beam splitter (PBS) 502, a first SOF 504, a second SOF 506, an conventional imaging chip 508 and/or any other components. In this example, the first SOF is a reflective SOF and thus may also referred to a RSOF 504 as shown. In this example, the second SOF is also a reflective SOF and thus may also be referred as a RSOF 506.

In this example, the PBS is configured as shown to split lights from an object of interest to the conventional imaging sensor 500 (e.g., an object in the FOV, whose image is to be captured by the imaging sensor 500) are split by the PBS 502. The two orthogonally polarized components of the incident lights are splitter out at the PBS. The vertically polarized component (i.e. "s" component) is reflected to hot the first RSOF 504, and the parallel component (i.e. "p" component) is transmuted to hit the RSOF 506.

As shown, in this example, the brightness of both of "p" and "s" components is adjustable by the RSOFs 504 and 506, respectively. As shown, the "p" and "s" lights adjusted by both RSOFs are reflected back to PBS 502 with 90 degrees rotation relative to their input polarization status. The status of both "p" and "s" components are thus reversed as they come back from their corresponding RSOF. The lights from two different directions are re-combined but output towards to down direction where the conventional imaging chip 508 is mounted. Please refer to FIGS. 3A and 3B, for example implementations for achieving the light adjustments using the RSOF 504 and RSOF 506 to adjust the brightness of the lights in accordance with the disclosure. Thus, this example provides a capability to the imaging sensor 500 such that values of "p" and "s" components for a given pixel in the image of the object can be adjusted dynamically before the lights hit the imaging sensor 500 in a first pass, rather than post processing after the lights are received by the imaging chip 508.

In this example, the PBS is configured as shown to split lights from an object of interest to the imaging sensor 500 (e.g., a object in the FOV, whose image is to be captured by the imaging sensor 500) are split by the PBS 502. The perpendicular component (s) of the incident lights is reflected at the PBS to hit the first RSOF 504, and the parallel component (p) is transmuted through the PBS 502 to hit the RSOF 506.

One advantage provided by ISWBSA is that enables the encompassing device of the imaging sensor 500 to facilitate dynamic "p" and "s" adjustments for a given pixel in the image of an object on a first pass of the lights. Conventionally, to achieve such a feature for an imaging device, an add-on filter needs to be placed before the imaging system and a user (e.g., a photographer) is required to manually configure the add-on filter for adjusting desired "p" and "s" ratio to the final image. In this example, the RSOFs 504 and 506 are employed so that dynamic adjustment of the "p" and/or "s" components for a given pixel value are achievable. For instance, by way of illustration, an image of a lake, for an example, may be highly reflective such that objects (i.e. fishes and underwater stones) may not clearly seen or even seen at all in the image, when the it is bright. With the ISWBSA, dynamic adjustment of "s" components (e.g., reducing their values) for certain pixel areas can be achieved in the image where the water is reflective, while maintain the "p" component value in those pixel areas.

Another advantage for the ISWBSA is high photo fidelity can be achieved by dynamically adjusting "p" and/or "s" components for one or more given pixels in the image when the "p" and/or "s" component values for those pixels are reduced due to capturing angle or any other factors. For instance, a loss of "p" and/or "s" component value for a given pixel in the image can be automatically detected or conditioned (e.g., based a time of the day or based on a capturing angle of the object) and RSOFs 504 and 506 can be configured dynamically to facilitate "p" and/or "s" adjustments to compensate for their losses that may degrade the fedelity of photos.

Figure 6:
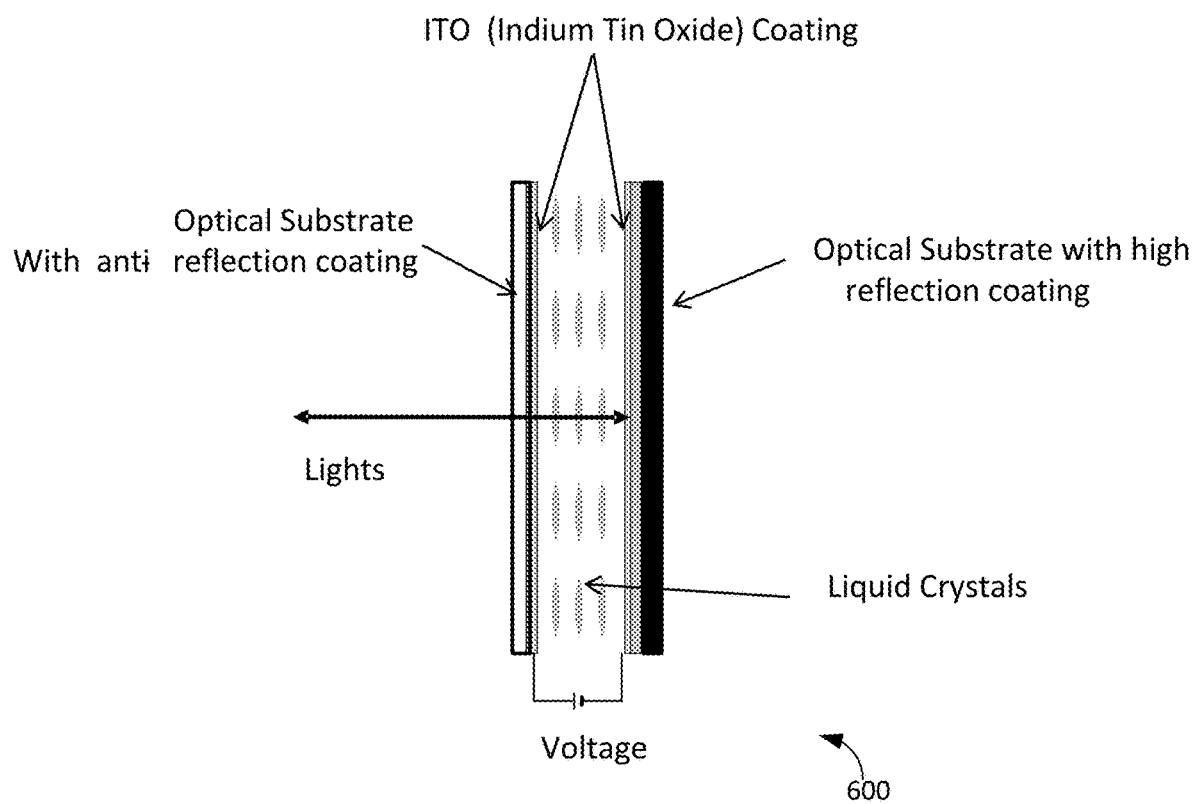
FIG. 6 illustrates an example smart filter shown in FIG. 5.

FIG. 6 also illustrates an example SOF shown in FIG. 5, such as RSOF 504 or 506. A shown, in this embodiment, the example SOF 600 can include an optical substrate, an transparent ITO electric coating layer, a Liquid Crystal layer, another ITO coating layer, a high-reflection coating layer and/or any other components. Incident lights ("p" or "s") can hit these layers in sequence, and then back-pass these layers in the 2nd time with a reversed order of the layers. In some implementations, a uniform voltage can be applied across all of pixels of the RSOF This would make the SOF layer act as a regular neutral density filter. One motivation behind this configuration is that within lights, light intensity distribution of different components may be different. Thus, by employing two separate SOFs to process different components such as the "p" and "s" components of the lights, this configuration shown in FIG. 6 may improve fidelity of the imaging output in comparison a single SOF configured to process both components.

Figure 7:
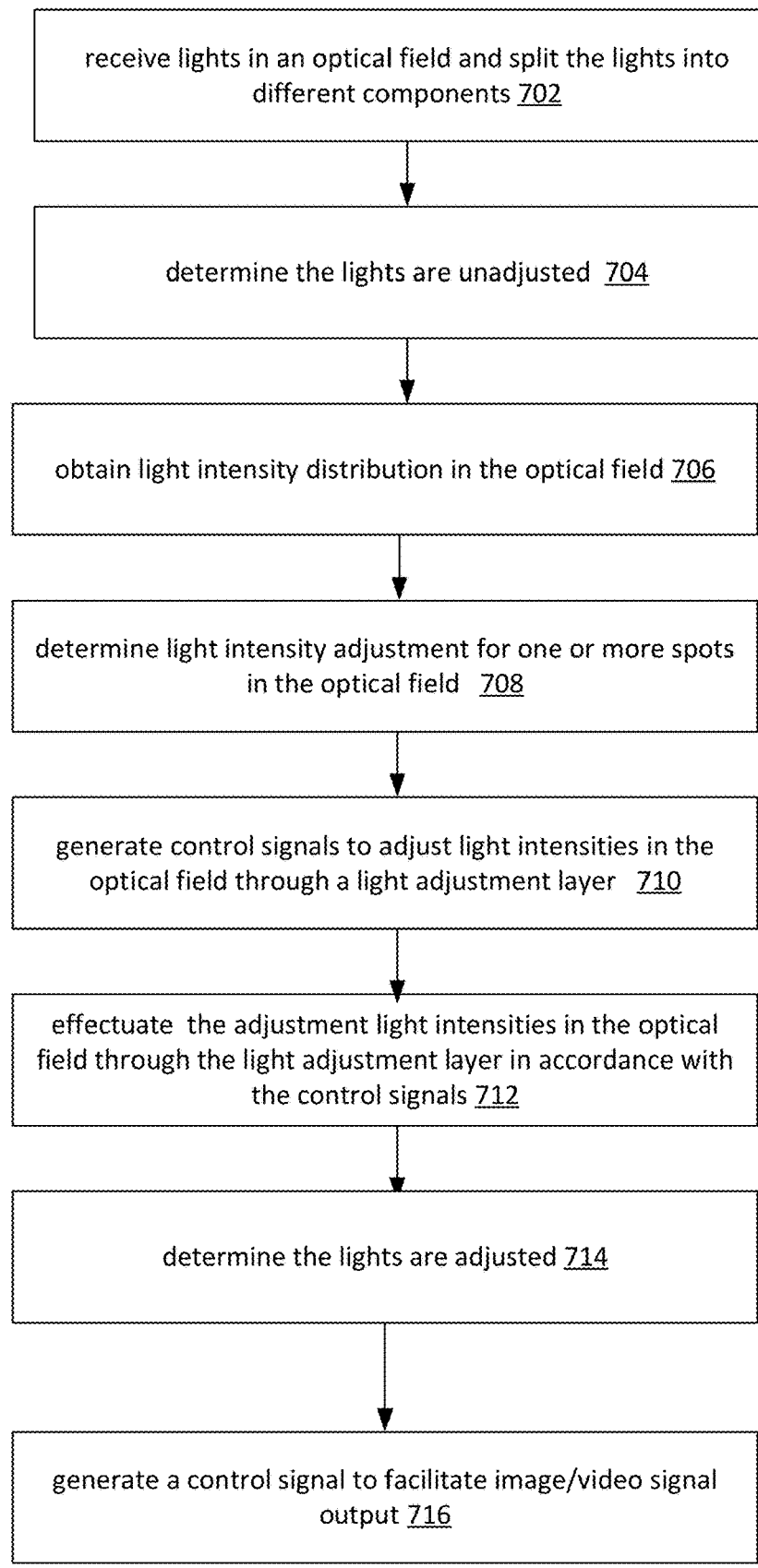
FIG. 7 is a flow diagram illustrating an exemplary method for facilitating adjustment of light intensities in an optical field using an imaging sensor with brightness self-adjustment in accordance with the disclosure.

FIG. 7 is a flow diagram illustrating an exemplary method 800 for facilitating adjustment of light intensities in an optical field using a smart optical filter in accordance with the disclosure. It is described with reference to FIGS. 1-6. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, incident lights in an optical field may be received. In some embodiments, the operation 702 may involve splitting the lights into multiple components such as those shown in FIG. 6. In various implementations, operations performed at 702 can be implemented using a pre-sensor, a beam splitter, and/or a sensor array circuit the same as or substantially similar to pre-sensor 302, a beam splitter 602 and/or sensor array circuit 306 as described and illustrated herein.

At an operation 704, it can be determined the lights are unadjusted when hitting the sensor array. In various implementations, operations performed at 704 can be implemented by a control circuit the same as or substantially similar to the control circuit 307 as described and illustrated herein At an operation 706, intensity distribution for the lights received at 702 may be obtained. This may involve obtaining intensity values for the lights received at 702. In various implementations, operations performed at 706 can be implemented by a control circuit using pre-sensor and/or a sensor array circuit the same as or substantially similar to the control circuit 307, pre-sensor 302 and/or sensor array circuit 306 as described and illustrated herein.

At an operation 708, adjustment of light intensities in the optical field may be determined for one or more zones in the optical field. As described and illustrated herein, light intensities in the optical field may vary in certain situations that can lead information loss in an final image capturing one or more objects in the optical field. In some implementations, one or more thresholds for light intensities can be predetermined and stored. The light intensity values generated/detected at 706 in those implementations can be compared with the one or more thresholds to determine respective difference values. These difference values can then be processed to determine amounts of adjustment for "smoothing"/"neutralizing" the light intensities differences reflected by the difference values. In some implementations, operation 707 may be performed by a control circuit the same as or substantially similar to the control circuit 306 illustrated and described herein.

At an operation 710, one or more control signals may be generated to adjust the light intensities from the optical field based on the adjustment determined at 707. As described and illustrated herein, a smart optical filter in accordance with the disclosure can be employed to achieve such adjustment. The smart optical filter can comprise a light adjustment layer of optical material such as liquid crystal modules. The light adjustment layer may be divided into pixels corresponding to different zones in the optical field. An example of the light adjustment layer is provided in FIGS. 2A-C. The control signals generated at 710 can include information for controlling an orientation of the optical material such as the liquid crystal modules at a given pixel on the light adjustment layer. In some implementations, operation 710 may be performed by a control circuit the same as or substantially similar to the control circuit 306 illustrated and described herein.

At 712, the adjustment of the light intensities in the optical filed can be effectuated through the light adjustment layer in accordance with the one or more control signals generated at 707. In some implementations, operation 712 may be performed by a driving circuit the same as or substantially similar to the driving circuit 304 illustrated and described herein.

At an operation 714, it can be determined that lights are adjusted by the light adjustment layer at 712. In various implementations, operations performed at 714 can be implemented by a control circuit the same as or substantially similar to the control circuit 307 as described and illustrated herein.

At an operation 716, a control signal can be generated to facilitate image/video signal output. In various implementations, operations performed at 716 can be implemented by a control circuit the same as or substantially similar to the control circuit 307 as described and illustrated herein.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An image sensor having a brightness self-adjust capability, the image sensor comprising:
   polarizing beam splitter (PBS) and at least two reflective smart optical filters (RSOF) including a first RSOF and a second RSOF and a conventional imaging chip, wherein the PBS is configured to:
   split an incoming light into at least two orthogonally polarized components including a "s" component and a "p" component:
   direct the "s" component light onto the first RSOF;
   allow the "p" component light to transmute through the PBS towards the second RSOF;
   receive and combine the returned "s" component and "p" component lights from the first and second RSOFs;
   direct the combined lights onto the conventional imaging chip and wherein
   the first and second RSOF are each configured to adjust a received light at pixel level dynamically, wherein the first or second RSOF comprises:
   a light adjustment layer made of adaptive optical materials, the light adjustment layer comprising a set of pixels, wherein the pixels include a first pixel;
   a control circuit configured to generate control signals to control adjustment of one or more light transparency levels at the set of pixels based on the light intensity distribution, wherein the control signals includes a first control signal to control adjustment of a first light transparency level at the first pixel; and
   an imaging chip configured to receive lights and facilitate output of image and/or video signals based on the received lights; and, wherein the control circuit is further configured to:
   obtain light intensity distribution information regarding light intensity distribution in a field of view (FOV) of the imaging sensor; and
   control the light adjustment layer to adjust, for the sensor array, the lights through the set of pixels according to the light intensity distribution information.

2. The image sensor of claim 1, wherein the control circuit is configured such that the light intensity distribution information is obtained from the sensor array.

3. The image sensor of claim 1, wherein the control circuit is further configured to:
   detect the lights passing through the light adjustment layer are unadjusted; and
   in response to the detection that the lights passing through the light adjustment layer are unadjusted, generate a control signal to instruct the light adjustment layer to adjust the lights.

4. The image sensor of claim 1, wherein the control circuit is further configured to:
   detect the lights passing through the light adjustment layer are adjusted;
   in response to the detection that the lights passing through the light adjustment layer are adjusted, generate a control signal to instruct the sensor array to facilitate the output of the image and/or video signals.

5. The image sensor of claim 1, further comprising a pre-sensor configured to: detect the light intensity distribution of the lights before they hit the light adjustment layer, and the lights are adjusted by the light adjustment layer according to the light intensity distribution information obtained by the pre-sensor.

6. The image sensor of claim 5, wherein the pre-sensor is operatively connected to the control circuit and wherein the control circuit is configured to obtain the light intensity distribution information from the pre-sensor.

7. The image sensor of claim 1, wherein the light adjustment layer is arranged at one of two positions including a first position and a second position, wherein at the first position, the light adjustment layer is not operable to adjust the lights, and at the second position, the light adjustment layer is operable to adjust the lights.

8. The image sensor of claim 7, wherein the light adjustment layer can be manually transitioned between the first and second positions.

9. The image sensor of claim 1, wherein the light adjustment layer is a first light adjustment layer, and the image sensor system further comprises a second light adjustment layer; and, wherein:
the first light adjustment layer is configured to receive and adjust the s-component light; and
the second light adjustment layer is configured to receive and adjust the p-component light.

10. The image sensor of claim 9, wherein first light adjustment layer includes a reflector configured to reflect the first component of the lights back to the beam splitter.

11. A method for using an imaging sensor to adjust light intensity, wherein the imaging sensor comprises a polarizing beam splitter (PBS) and at least two reflective smart optical filters (RSOF) including a first RSOF and a second RSOF and an imaging sensor, a control circuit, and a conventional imaging chip, wherein the light adjustment layer is made of adaptive optical materials and comprises a set of pixels including a first pixel, the method comprising:
splitting, by the PBS, an incoming light into at least two orthogonally polarized components including a "s" component and a "p" component:
directing, by the PBS, the "s" component light onto the first RSOF;
allowing, by the PBS, the "p" component light to transmute through the PBS towards the second RSOF;
receiving, by the PBS, and combining the returned "s" component and "p" component lights from the first and second RSOFs;
directing, by the PBS, the combined lights onto the conventional imaging chip, obtaining, by the control circuit, light intensity distribution in the field of view (FOV) of the imaging sensor; and
generating control signals to control, by the control circuit, the light adjustment layer to adjust, for the sensor array, the lights through a set of pixels on the light adjustment layer according to the light intensity distribution information, wherein the control signals includes a first control signal to control adjustment of a first light transparency level at the first pixel of the light adjustment layer.

12. The method according to claim 11, wherein the light intensity distribution information is obtained from the sensor array.

13. The method according to claim 11, further comprising:
detecting the lights passing through the light adjustment layer are unadjusted; and
in response to the detection that the lights passing through the light adjustment layer are unadjusted, generating the first control signal to instruct the light adjustment layer to adjust the lights.

14. The method according to claim 11, further comprising:
detecting the lights passing through the light adjustment layer are adjusted;
in response to the detection that the lights passing through the light adjustment layer are adjusted, generating a control signal to instruct the sensor array to facilitate the output of the image and/or video signals.

15. The method according to claim 11, wherein the image sensor further comprises a pre-sensor configured to: to detect the light intensity distribution of the lights before they hit the light adjustment layer; and, wherein the light intensity distribution information is obtained from the pre-sensor.

* * * * *